United States Patent
Navani et al.

(10) Patent No.: US 10,366,438 B2
(45) Date of Patent: Jul. 30, 2019

(54) PRODUCT NOTIFICATION AND RECOMMENDATION TECHNOLOGY UTILIZING DETECTED ACTIVITY

(71) Applicant: Cellco Partnership, Arlington, VA (US)

(72) Inventors: Anil Navani, Watchung, NJ (US); Prasad V. Duggineni, Somerset, NJ (US); Christian Navarro, Bayonne, NJ (US); Mithun Chackankulam, Somerville, NJ (US); Snehal N. Mehta, Florham Park, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 1050 days.

(21) Appl. No.: 14/226,608

(22) Filed: Mar. 26, 2014

(65) Prior Publication Data
US 2015/0278906 A1 Oct. 1, 2015

(51) Int. Cl.
*G06Q 30/06* (2012.01)

(52) U.S. Cl.
CPC ................. *G06Q 30/0631* (2013.01)

(58) Field of Classification Search
None
See application file for complete search history.

(56) References Cited

U.S. PATENT DOCUMENTS

| | | | | |
|---|---|---|---|---|
| 2008/0111685 A1* | 5/2008 | Olson | .................. | B65D 55/028 340/545.6 |
| 2009/0204600 A1* | 8/2009 | Kalik | ..................... | G01C 21/30 |
| 2011/0065428 A1* | 3/2011 | Schroeter | .......... | H04M 1/72563 455/418 |
| 2011/0219080 A1* | 9/2011 | McWithey | ........ | H04M 1/72552 709/206 |
| 2013/0237254 A1* | 9/2013 | Papakipos | .............. | G06Q 10/10 455/456.3 |
| 2013/0303143 A1* | 11/2013 | Schrader | ............... | H04W 12/08 455/418 |
| 2014/0365944 A1* | 12/2014 | Moore | .................. | G06F 3/0484 715/772 |

OTHER PUBLICATIONS

Shaout, Adnan K. and Adam E. Bodenmiller. "A Mobile Application for Monitoring Inefficient and Unsafe Driving Behavior." https://pdfs.semanticscholar.org/9305/3dbdfd61bd6a7a8140d5074003b2c1dc1eff.pdf (Year: 2011).*

\* cited by examiner

*Primary Examiner* — Kathleen Palavecino
*Assistant Examiner* — Lance Y Cai

(57) ABSTRACT

An exemplary system and method provides a product notification and recommendation technology for monitoring a computing device to detect particular use-cases of device activity and providing a notification through a user interface that indicates at least one product corresponding to the detected particular use-cases. In this way, the product notification and recommendation technology adds a new dimension of usage-based personalization to targeted advertising that results in timely product and service recommendations.

14 Claims, 7 Drawing Sheets

Process Flow 100

PRODUCT NOTIFICATION AND RECOMMENDATION TECHNOLOGY UTILIZING DETECTED ACTIVITY

BACKGROUND

A traditional model for electronic-based commerce uses only two parameters to recommend products to users: browsing history and previous purchases. For example, if a user utilized a web browser to both visit a manufacturer's website and purchase a mobile device, the traditional model tracks the visit (browsing history) and the purchase (previous purchases) such that products by that manufacturer related to mobile devices may be recommended to the user via web browser advertisements.

However, success rates for marketing campaigns that utilize this traditional model are low due to generic, unfocused messages that do not match customer needs at the right time. Thus, it would be desirable to provide a system and method that relies upon at least the additional dimension of device activity such as usage patterns to make targeted, timely product and service recommendations.

DETAILED DESCRIPTION

A system and method provides a product notification and recommendation technology for monitoring a computing device to detect particular use-cases of device activity and providing a notification through a user interface that indicates at least one product and/or service corresponding to a detected use-case. In this way, the product notification and recommendation technology utilizes a new dimension of usage-based personalization for targeted advertising that results in timely product and service recommendations. Recommendations are considered targeted because they are based on device and user information, such as device compatibility and user preferences, and are considered timely because the notification of the product is within a short timespan (e.g., substantially instantaneously) of the detected use-case.

Figure 1:
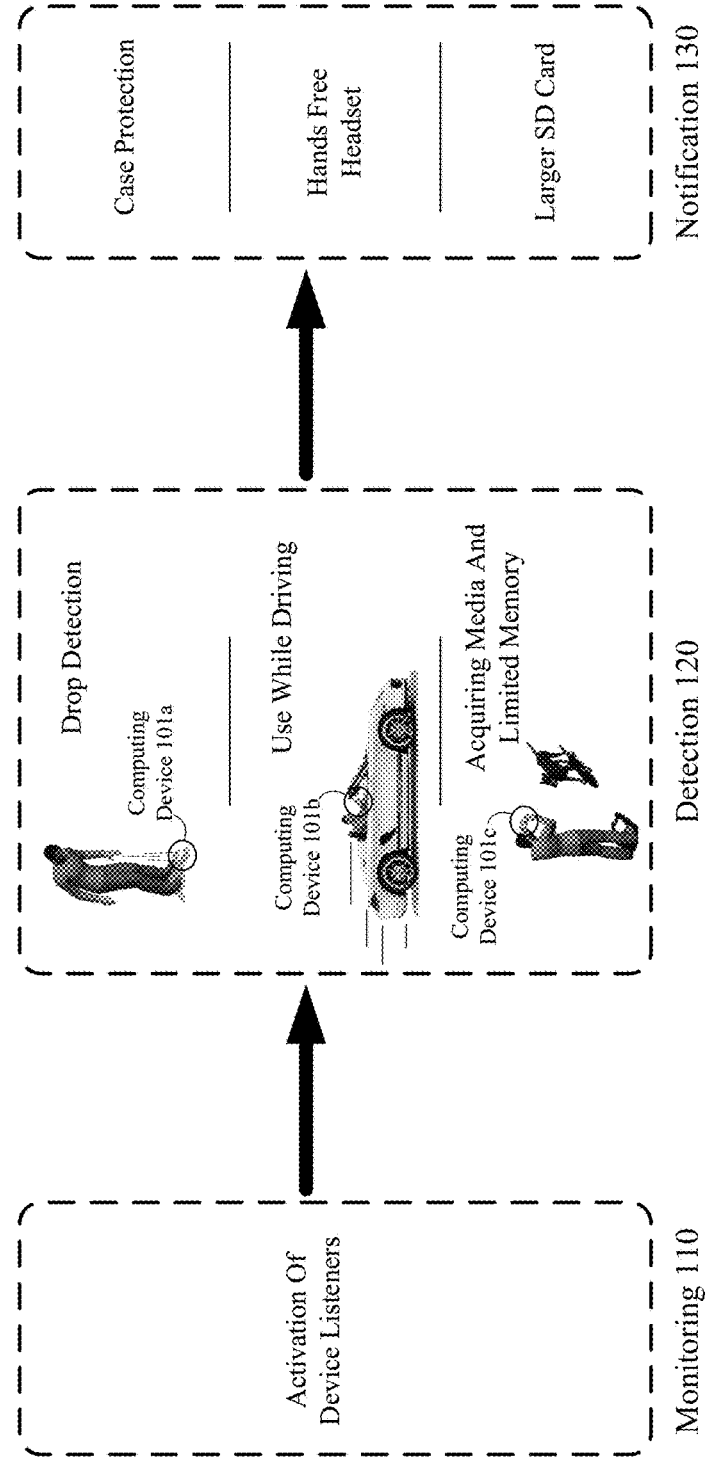
FIG. 1 illustrates a flow of a product notification and recommendation technology.

FIG. 1 illustrates a flow 100 of a product notification and recommendation technology ("technology") with respect to computing devices 101, which are further described below in FIG. 2. In the flow 100, the technology utilizes a set of device listeners that monitor 110 device activities of a computing device 101. For instance, the device activities may include movements and use of the computing devices 101. Examples of movements may include, without limitation, a free fall or drop, a call answering motion, a driving speed movement, etc. Examples of use may include, without limitation, operating a call, messaging, web browsing, gaming, etc.

Device listeners may be the hardware and/or software components of the technology that output values, such as a Boolean value, based on a status of the computing devices 101. Examples of the device listeners may include but are not limited to an accelerometer listener that is configured to acquire an accelerometer value of the computing device 101, a phone listener that is configured to acquire call or messaging information (e.g., destination information, number, call time, data amount, character information, etc.) of the computing device 101, a peripheral listener that is configured to detect whether a peripheral is connected to the computing device 101, a location listener that is configured to acquire a set of location values of the computing device 101, a memory listener that is configured to acquire memory information (e.g., capacity information, data type information, etc.) of the computing device 101, and a media listener that is configured to detect whether media is being acquired by the computing device 101. Examples of media may include, without limitation, apps, music, video, pictures, voice memos, documents, contacts, coupons, gift cards, and the like.

Detection 120 of particular use-cases by the technology occurs when a combination of device listeners output a combination of values (e.g., a set of Boolean 'high' signals from a combination of device listeners) that indicate a particular use-case. For instance, use-cases may include dropping a computing device 101a, using a computing device 101b while driving, and acquiring media by a computing device 101c that has a limited memory.

Thus, with regard to 'drop detection' and the computing device 101a, the technology detects a drop when the accelerometer listener outputs a Boolean 'high' signal. That is, while the accelerometer listener acquires the accelerometer value, e.g., from an accelerometer of the computing device 101a, the accelerometer listener compares the accelerometer value to a threshold accelerometer value. When the accelerometer value is less than the threshold accelerometer value, the accelerometer listener may output a Boolean 'high' signal. In response to receiving the Boolean 'high' signal from the accelerator listener, the technology provides a notification 130 of a product, e.g., relating to a case for protection of the computing device 101a.

With regard to 'use while driving' and the computing device 101b, the technology detects a driving and computing device 101b use when the phone, peripheral, and location listeners output Boolean 'high' signals. That is, while the phone listener acquires call or messaging information of the computing device 101b, the phone listener also determines from the call or messaging information when the computing device 101b is in use. When the phone listener determines from the call or messaging information that the computing device 101b is in use, the phone listener may output a Boolean 'high' signal. Further, since the peripheral listener detects whether a peripheral is connected to the computing device 101b (e.g., when a Bluetooth features is activated and in use), the peripheral listener may output a Boolean 'high' signal when a peripheral is connected. Furthermore, while the location listener acquires a set of location values that include time and location components, e.g., from a location determination technology of the computing device 101b (such as global positioning systems or signal triangulation), the location listener also calculates a speed of the computing device 101b based on the set of location values. When the location listener determines the speed of the device is greater than a threshold speed value, the location listener may output a Boolean 'high' signal. In response to receiving the Boolean 'high' signals from the phone, peripheral, and location listeners, the technology provides a notification 130 of a product, e.g., relating to a hands-free headset.

With regard to 'acquiring media and a limited memory' and the computing device 101c, the technology detects a media acquisition by the computing device 101c and a limited memory space of a current memory of the computing device 101c when the media and memory listeners output Boolean 'high' signals. That is, since the media listener detects whether media is being acquired by the computing device 101c, the media listener may output a Boolean 'high' signal when a media acquisition is detected. Further, while the memory listener acquires memory information of the computing device 101c, the memory listener also compares a remaining memory value of the memory information to a threshold memory value. When the remaining memory value is less than the threshold memory value, the memory listener may output a Boolean 'high' signal. In response to receiving the Boolean 'high' signals from the media and memory listeners, the technology provides a notification 130 of a product, e.g., relating to a secure digital (SD) card that is larger than the current memory of the computing device 101c.

Figure 2:
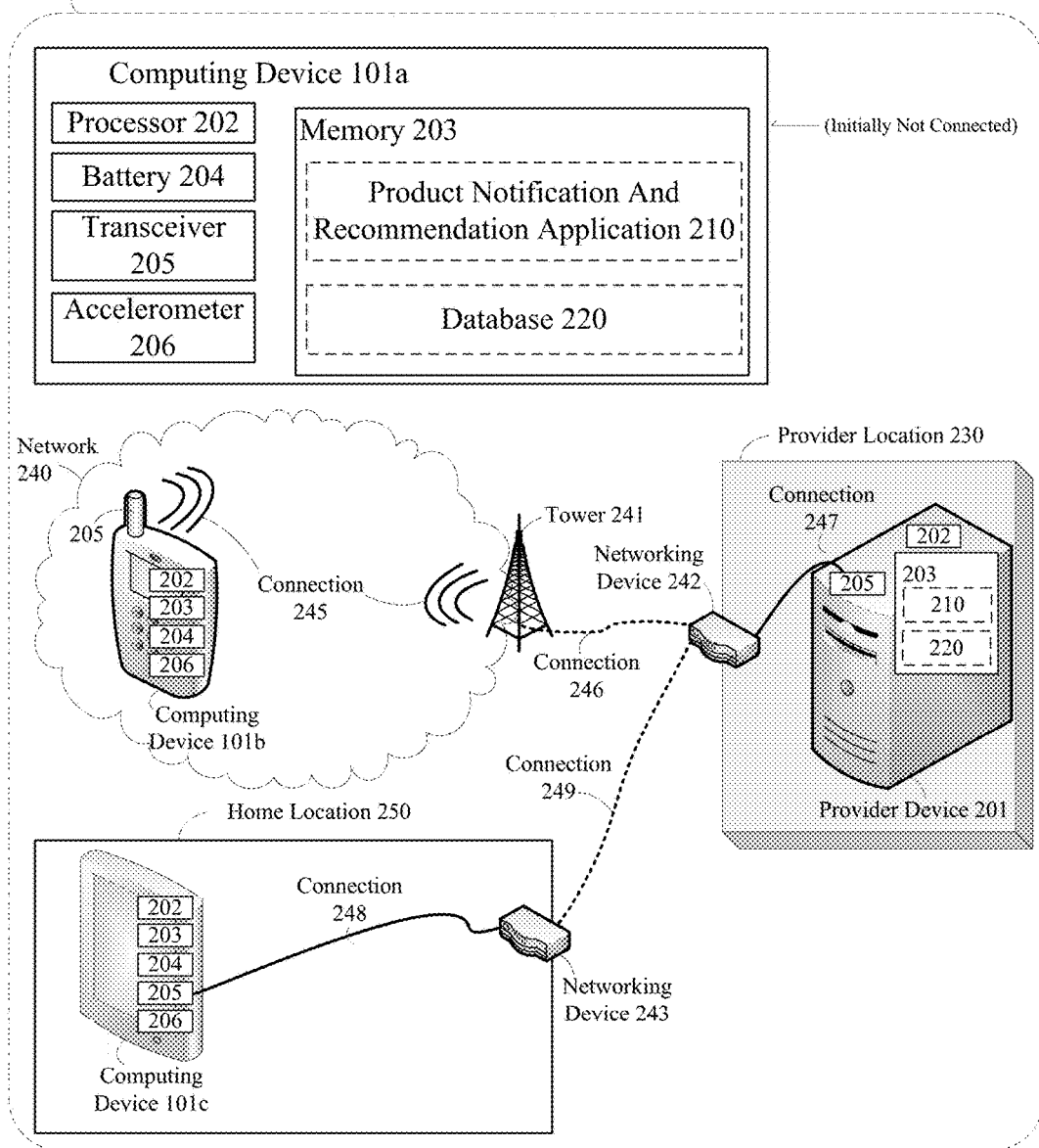
FIG. 2 illustrates a scheme in which a product notification and recommendation technology operates.

FIG. 2 illustrates a scheme 200 having computing devices 101 (e.g., user devices as described below), each of which includes a processor 202, a memory 203, a battery 204, a transceiver 205, and an accelerometer 206. FIG. 2 also illustrates a provider device 201 (e.g., server as described below), which also includes a processor 202, a memory 203, and a transceiver 205. The memories 203 of the devices 101, 201 may include a product notification and recommendation application 210 and/or a database 220 (as illustrated by the dashed-line).

Further, FIG. 2 illustrates a provider location 230, a network 240, a tower (e.g., base station/eNB) 241, networking devices 242, 243, connections 245-249, and a home location 250, each of which may support and/or contribute to communications within the scheme 200. For example, the computing device 101b within the network 240 may communicate with the provider device 201 at the provider location 230 via: the transceiver 205 of the computing device 101b over the connection 245 to the tower 241, which in turn forwards the communications over the connection 246 to the networking device 242 of the provider location 230, which further communicates over the connection 247 with the transceiver 205 of the provider device 201. Similarly, the computing device 101c within the home location 250 may communicate with the provider device 201 via: the transceiver 205 of the computing device 101c over the connection 248 to the networking device 243, which in turn forwards the communications over the connection 249 to the networking device 242 of the provider location 230, which further communicates over the connection 247 with the transceiver 205 of the provider device 201.

The items of the scheme 200 will now be further described. The scheme 200 includes the devices 101, 201, 242, 243, that may be any computing system and/or device that includes a processor and a memory (e.g. 202 and 203, respectively). Computing systems and/or devices generally include computer-executable instructions, where the instructions may be executable by one or more devices such as those listed below. Computer-executable instructions may be compiled or interpreted from computer programs created using a variety of programming languages and/or technologies, including, without limitation, and either alone or in combination, Java™, C, C++, Visual Basic, Java Script, Perl, etc. The scheme 200 and items therein (e.g., devices 101, 201, 242, 243) may take many different forms and include multiple and/or alternate components and facilities, as illustrated in the Figures. While exemplary systems, devices, modules, and sub-modules are shown in the Figures, the exemplary components illustrated in the Figures are not intended to be limiting. Indeed, additional or alternative components and/or implementations may be used, and thus the above communication operation examples should not be construed as limiting.

In general, computing systems and/or devices (e.g., devices 101, 201, 242, 243) may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OS X and iOS operating systems distributed by Apple Inc. of Cupertino, Calif., the BlackBerry OS distributed by Research In Motion of Waterloo, Canada, and the Android operating system developed by the Open Handset Alliance. Examples of computing systems and/or devices include, without limitation, cell phones (e.g., the device 101b), smart-phones, super-phones, tablet computers (e.g., the device 101c), next generation portable devices, mobile printers, handheld computers, secure voice communication equipment, networking hardware (e.g., the devices 242, 243), or some other computing system and/or device. Alternatively, computing systems and/or devices may also be a computer workstation, a server (e.g., the device 201), a desktop, a notebook, or a laptop.

Further, the processor or the microprocessor (e.g., processors 202) of computing systems and/or devices receives instructions from the memory (e.g., memories 203) and executes these instructions, thereby performing one or more processes, including one or more of the processes described herein. Such instructions and other data may be stored and transmitted using a variety of computer-readable mediums (e.g., memory 203).

A processor 202 may include processes comprised from any hardware, software, or combination of hardware or software that carries out instructions of a computer programs by performing logical and arithmetical calculations, such as adding or subtracting two or more numbers, comparing numbers, or jumping to a different part of the instructions. For example, the processor 202 may be any one of, but not limited to single, dual, triple, or quad core processors (on one single chip), graphics processing units, visual processing units, and virtual processors.

A memory 203 may be, in general, any computer-readable medium (also referred to as a processor-readable medium) that may include any non-transitory (e.g., tangible) medium that participates in providing data (e.g., instructions) that may be read by a computer (e.g., by processors 202 of the devices 101, 201, 242, 243). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including radio waves, metal wire, fiber optics, and the like, including the wires that comprise a system bus coupled to a processor of a computer.

Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

The computing devices 101, 201, 242, 243 may also be any computing system and/or device that includes a battery, a transceiver, and an accelerometer (e.g. 204, 205, and 206, respectively), along with a display and location determination technology.

For example, a battery 204 is an example of a power device consisting of one or more electrochemical cells that convert stored chemical energy into electrical energy and is configured to supply a power source or electricity to the components of the devices 101. A power source may also be a power cord to an external power source in combination with or lieu of the battery 204.

A transceiver, such as transceivers 205, may be any connector used for digital or analog signal transfers of a communication technology. Examples of communication technologies may include, without limitation, any wired or wireless communication technology, such as near field communication (NFC), Bluetooth®, Wi-Fi, and similar radio technologies that exchange electronic data by converting propagating electromagnetic waves to and from conducted electrical signals. For instance, the transceivers 205 may be any antenna technology, such as cellular, Wi-Fi, or the like, that is used to exchange data wirelessly using radio waves over a radio range or network that enables communication (e.g., a transceiver 205 of computing device 101a may be a cellular antenna utilized to communicate with the tower 241).

An accelerometer 206 is a transducer that converts one form of energy, such as mechanical energy, to another, such as electrical energy. Accelerometer 206 is part of a larger group of sensors that may be included in the computing devices 101, examples of which include but are not limited to tactile sensors, vibration powered generators, load cells, strain gauges, or the like and may be constructed from but not limited to conductive rubber, metallic capacitive sensing elements, and the like. Sensors, in general, may include electronic circuitry that detects, converts, and transmits a sensor signal related to a weight and a motion of the computing devices 101. The size, location, and shape of the sensor system and its components may vary according to the computing devices 101. The components of the sensor system may particularly include sensors that are connected wirelessly or via wires to the processor 202 of the devices 101, 201, 242, 243. Examples of energy that the sensor may convert or produce include mechanical energy, elastic energy, sound energy, thermal energy, chemical energy, electric energy, and the like.

The devices 101, 201, 242, 243 may include a display, support user interfaces, and/or communicate within the scheme 200. A display is an output device for presentation of information in visual or tactile form, such as user interfaces or web portals. Examples of display may include, without limitation, cathode ray tube display, light-emitting diode display, electroluminescent display, electronic paper, plasma display panel, liquid crystal display, high-performance addressing display, thin-film transistor display, organic light-emitting diode display, surface-conduction electron-emitter display, laser TV, carbon nanotubes, quantum dot display, interferometric modulator display, and the like. Thus, a display of any devices 101, 201, 242, 243 may present user interfaces or a web portal to a user, such that the user may interact with and receive information from other devices 101, 201, 242, 243.

The devices 101, 201, 242, 243 may include a location determination technology that enables the determination of a current geographic position of an associated or other device. Examples of location determination technology may include, without limitation, global positioning systems, indoor positioning system, local positioning system, and mobile phone tracking.

The devices 101, 201 may utilize the respective processor 202 and memories 203 to operate the product notification and recommendation application 210 (e.g., as further described with reference to FIG. 3 below) to generate user interfaces on the display, execute device activity monitoring, detect particular use-cases of device activity; and generate records memorializing the device activity. Further, product notification and recommendation application 210 may generally include various kinds of mechanism, software, and/or computer programs for carrying out instructions, such as application software (also referred to as a software application, an application program, an application, or an app) that causes the devices 101, 201, 242, 243 to perform tasks beyond the running themselves. Examples of the application software include accounting software, enterprise software, graphics software, media players, and office suites.

The devices 101, 201 may further utilize the respective processor 202 and memories 203 to operate the database 220 (e.g., as further described with reference to FIG. 3 below) to manage and store records memorializing the device activity. Further, databases, data repositories or other data stores (e.g., the database 220) described herein may generally include various kinds of mechanisms for storing, providing, accessing, and retrieving various kinds of data, including a hierarchical database, a set of files in a file system, an application database in a proprietary format, a relational database management system (RDBMS), etc. Each such data store may generally be included within or external to a computing system and/or device (e.g., devices 101, 201, 242, 243) employing a computer operating system such as one of those mentioned above, and/or accessed via a network (e.g., network 140) or connection in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

The computing devices 101, in general, may be user devices—such as a smartphone, a table computer, etc.—that operate the product notification and recommendation application 210 to monitor and process device activity of the computing devices 101, access/receive and generate records, and provide notifications in support of targeted advertising that results in timely product and service recommendations. Further, the operation of the product notification and recommendation application 210 by the computing devices 101 may be performed without regard to a connection to the provider device 201 and/or other system or network. Thus, as illustrated in FIG. 2, the product notification and recommendation application 210 may operate on a computing device 101a that is not connected to any of the illustrated items, but is capable of being connected at any time.

The provider device 201, in general, may be a server that operates the product notification and recommendation application 210 to monitor and process device activity of the computing devices 101, access/receive and generate records, and provide notifications in support of targeted advertising that results in timely product and service recommendations. In general, a server may be any computing system and/or device (as described above) acting as databases, data repositories or other data stores that includes any type of data source and/or file system that manages the records memorializing the content transfers. For instance, data sources may include a data management client, along with licenses (e.g., a license that permits control and access of record store by the computing devices 101) relating to data management access and/or configurations. Thus, the device management client may include executable instructions that manage the communications with the computing devices 101 by setting configurations and diagnostics based on a particular protocol.

In some examples, the elements of the devices 101, 201, 242, 243 may be implemented as computer-readable instructions (e.g., software) on one or more devices (e.g., servers, personal computers, etc.), stored on computer readable media associated therewith (e.g., disks, memories, etc.). A computer program product may comprise such instructions stored on computer readable media for carrying out the operations described herein.

The exemplary infrastructure components of the scheme 200 that support communication operations between the devices 101, 201 will now be described. The exemplary infrastructure components may include the network 240, the tower 241, the network devices 242, 243, and the connections 245-249.

A network 240 (and provider and home locations 230, 250) may be a system that provides the infrastructure through which the devices 101, 201 communicate. In general, a network (e.g., network 240 and provider and home locations 230, 250) may be a collection of computers and other hardware to provide infrastructure to establish virtual connections and carry communications. For instance, a network may be an infrastructure that generally includes edge, distribution, and core devices (e.g., tower 241 or network devices 242, 243) and enables a path (e.g., connections 243, 242) for the exchange of information between different devices and systems (e.g., between devices 101, 201). Further, a network may be any conventional networking technology, and may, in general, be any packet network (e.g., any of a cellular network, global area network, wireless local area networks, wide area networks, local area networks, or combinations thereof, but may not be limited thereto) that provides the protocol infrastructure to carry communications. The network 240 is representative, and thus while a single cloud illustrates the network 240, this illustration may represent a single network, a combination of different networks components and technologies, and/or a plurality of networks, as described above.

The tower 241 may be tall structures designed to support antennas or aerials for telecommunications amongst the scheme 200, e.g., a type of transceiver. The tower 241 may enable the connections (e.g., 245, 246) that complete communication paths that carry signals to and/or from the network 240. For instance, the connection 245 completes a communication path from the network 240 via the tower 241 to the transceiver 205 of the computing device 101*b*. Further, the connection 246 completes a communication path from the network 240 via the tower 241 to the networking device 242.

The network devices 242, 243 may be any computing system and/or device as described above that is a gateway between the provider location 230 and the home location 250 to complete a communication path between the devices 101, 201. Additional examples of computing systems and/or devices with respect to the network devices 242, 243 include, without limitation, networking hardware such as gateways, routers, network bridges, switches, hubs, repeaters, multilayer switches, protocol converters, bridge routers, proxy servers, firewalls, network address translators, multiplexers, network interface controllers, wireless network interface controllers, modems, ISDN terminal adapters, line drivers, wireless access points, networking cables and the like.

The connections 245-249 may be wired or wireless connections between two endpoints (devices or systems) that carry electrical signals that facilitate virtual connections. Examples of connections 245-249 may be any transmission media including radio waves, metal wire, fiber optics, and the like. Virtual connections are comprised of the protocol infrastructure that enables communication to and from devices 101, 201, 242, 243. For instance, connection 245 may be a wireless connection (e.g., cellular connection) using radio waves over a radio range of the network 240 between the transceiver 205 of the computing device 101*b* and the tower 241; connection 246 may be a set of connections between the tower 241 and the networking device 242; connection 247 may be a wired connection between the networking device 242 and the transceiver 205 of the provider device 201; connection 248 may be a wired connection between the transceiver 205 of the computing device 101*c* and the networking device 243; and connection 249 may be a set of connections between the networking devices 242, 243. Further, the combination of connections 245-249 support the virtual connections of the scheme 200, and therefore, any device 101, 201, 242, 243 may communicate with another device 101, 201, 242, 243 based on a need of the scheme 200 to perform targeted, timely product and service recommendations.

Figure 3:
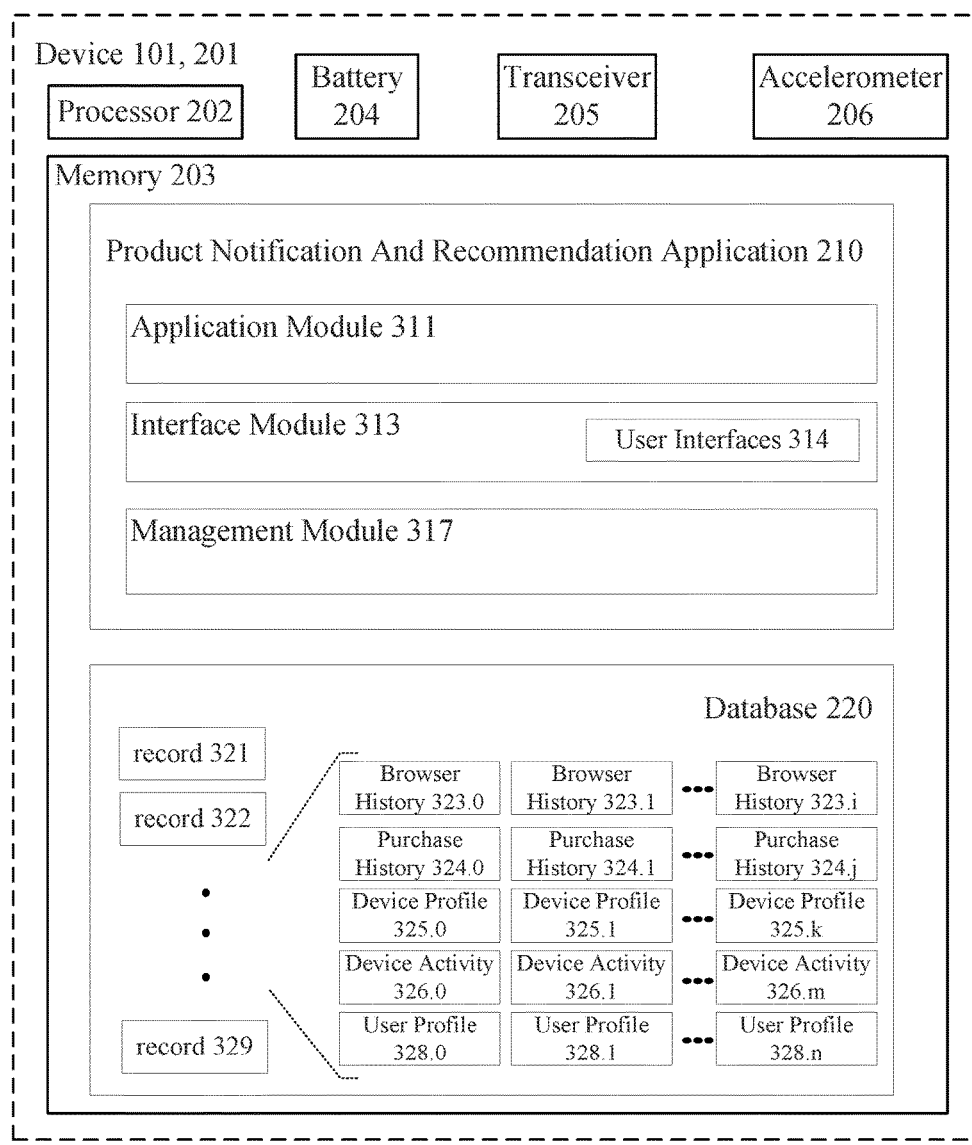
FIG. 3 illustrates an exemplary configuration of a product notification and recommendation application.

FIG. 3 illustrates an exemplary configuration of a product notification and recommendation application 210 ("application 210") stored on a memory 203 of the computing devices 101 or the provider device 201 (as illustrated by the dashed-box). The application 210 includes an application module 311, an interface module 313 that generates user interfaces 314, and a management module 317. Further, FIG. 3 illustrates an exemplary configuration of the database 220, which stores and manages records 321-329 (e.g., browser history 323, purchase history 324, device profile 325, device activity 326, and user profile 328).

Although one modular breakdown of the application 210 is offered, it should be understood that the same functionality may be provided using fewer, greater, or differently named modules. Further, although it is not shown, the application module 311 and the interface module 313 may be integrated with any of the above named modules. Also, a single device may be independently configured to include the entire operability of the application 210, as illustrated in FIG. 3. As another example, the operability of the application 210 may be divided between the devices 101, 201, where modules 311, 313, 317 may be located separately on different devices and accessed through connections 245-249 and/or distributed computing, such that the operability is provided for, shared, and relied upon by other devices.

The application module 311 may be any application programmable interface or application binary interface that includes a set of executable instructions configured to facilitate communication between the modules of the application 210 and hardware/software components external to the application 210, including the devices 101, 201. Examples application programmable and application binary interfaces include POSIX, Microsoft Windows API, Java API, Linux Standard Base, and the like. That is, the application module 311 may be configured to communicate directly with other applications, modules, models, devices, systems, and other sources through both physical and virtual interfaces. Further, the application module 311 may include executable instructions and specifications for routines, data structures, object classes, and variables that receive, package, present, and transfer content through a connection 145 or through a network 240. For example, the application module 311 may be configured to receive instructions from the interface module 313 or sources external to the device 101 and, based on those instructions, forward the instructions to the management module 317. The application module 311 may also manage the dispatching and receipt of records 321-329 along with integrating the application 210 with other applications and drivers, as needed per the operating system.

The interface module 313 may be an application programmable interface that includes a set of executable instructions for generating and managing user interfaces 314, which receive inputs that may authorize device activity detection (e.g., opt-in selections) and mange notifications to and from the application 210. For instance, the interface module 313 may be configured to generate, present, and provide one or more user interfaces 314 (e.g., in a menu, icon, tabular, map, pop-up, or grid format) in connection with other modules for presenting information and receiving inputs (e.g., indications of acceptance, deference, or rejection of the notification and/or configuration adjustments altering, updating, or changing the user preferences for the application 210). The inputs received by the user interfaces 314 may generally be communicated by interface module 313 to the application module 311, which in turn forwards the inputs to the management module 317 for processing.

The user interfaces 314 may include any presentation of information or data through a display, whether graphic or otherwise, where interaction between a user and the application 210 occurs. Examples of user interfaces 314 may include the data manipulation interfaces, graphical user interface (that allows users to interact with electronic devices through graphical icons and visual indicators), touchscreen interfaces, text-based interfaces, typed command labels or text navigation. The user interfaces may receive inputs indicating the user selections (e.g., single or multiple instances of product and service recommendations), configurations, and/or consent regarding notifications. The user interfaces 314 may further include notifications such as banners, icons, badges, alerts, sounds, text, or any combinations thereof. A banner may be a media or drop-down menu that extends from a top portion of an interface, a sub-interface, and/or display of the devices 101, 201 and that may include text, badges, and animated symbols. An icon and/or a badge may be a number or symbol that signals a link, an event, or a number of events. An alert may be a pop-up window that may be centered on the display and that may include text, badges, and animated symbols.

The interface module 313 may further generate new and unique interfaces particular to the application 210. The interface module 313 may also commandeer or utilize interface formatting local to the device in which the application 210 is stored thereon (e.g., appropriating interfaces of the devices 101, 201 or web portal interfaces for providing notifications and receiving inputs). The interface module 313 may thus generate or utilize local, terminal, web-based, and mobile interfaces and any similar interface that presents and receives information relative to the computing devices 101 and the provider device 201.

The management module 317 may be an application programmable interface that includes a set of executable instructions configured to monitor device activity and provide notifications. That is, the management module 317 utilizes a set of device listeners that monitor 110 device activities of a computing device. As noted above, the device activities may include movements and use of the computing devices 101. Various device activities may be divided into categories that identify different local environments (e.g., on-line/connected and physical/environment implementations) in which the computing devices 101 may operate. For instance, when the device is associated with a first category, such as an on-line/connected use category, examples of device activities may include, without limitation, a call answering motion, a driving speed movement, an operating a call, messaging, web browsing, etc. Further, when the device is associated with a second category, such as a physical use category, examples of device activities may include, without limitation, a free fall or drop, another device motion, a camera operation, gaming, etc. Furthermore, when the device is associated with a second category, such as an environmental category, examples of device activities may include, without limitation, a free fall or drop, hiking, boating, golfing, etc.

The management module 317 may also work in conjunction with the interface module 313 to enable the devices 101, 201 to receive inputs that consent or opt-in to notifications or that are in reply to product notifications. For example, notification may be provided by the interface and/or management modules 313, 317 based on inputs received from the user though an opt-in prompt, the inputs indicating to provide notification only during business hours of that computing device location and/or only applied to particular use cases. Further, each notification may include an option to turn off future notifications.

The management module 317 may utilize the records 321-329 to evaluate the device activity, such as evaluating information stored in the records 321-329 to identify relevant products, content, and/or services and to timely provide targeted recommendations for the users of the computing devices 101. Generating recommendations may include providing notifications of products that may be of interest to the user of the computing devices 101 based on product activity, where products that may be of interest are products that are compatible with the computing device 101. For example, recommendations may be specialized based on and/or determined from the computing devices 101 or a peripheral identifier of the peripheral connected to the computing devices 101, such as tailoring the recommendation based on different available products (e.g., if the peripheral device is a Bluetooth earpiece, the recommendation may be to upgrade to a newer model; if the computing devices 101 is detected within a moving vehicle and the peripheral device is a Bluetooth earpiece, a different earpiece or a car-related accessory may be recommended). Further, recommendations may be specialized based on and/or determined from categories (e.g., if environmental conditions based on a location determination technology indicates a tropical area or mountainous area, then the recommendations may be related to waterproof and/or super-tough peripherals respectively). Furthermore, may be specialized based on and/or determined from device history, location, other user devices in the area (e.g., children), how quickly the additional memory is likely to be used (e.g., location determination technology indicates the computing devices are located at a national/theme park vs. home/office), etc. In addition, the determination of which item/product to recommend may be based on business rules and/or sponsors of the application 210 (e.g., a business rule may include priorities with respect to which product a sponsor desires to promote and/or include priorities based on inventory levels, margins, user friendliness, etc.).

One exemplary set of recommendations is illustrated in Table 1. Thus, the management module 317 may for example access or retrieve the records 321-329 in the database 220 to provide intelligent assessments of each user's activities and the device activities.

communication may be an option for the user to directly trigger the downloading and storing of available the records 321-329. Further, the management module 317 may also work in conjunction with the interface module 313 to prompt or to notify the user of a product after the predefined set of conditions are met (e.g., when a particular use-case is detected). Regardless of whether the downloading and storing of the records 321-329 is automatic or user initiated, the records 321-320 may be communicated individually or collectively, such as in a bulk communication, as defined by the predefined set of circumstances.

TABLE 1

Recommendations Provided By Application 210

| Device Listener | Use-case | Product Recommendation | Service Recommendation |
|---|---|---|---|
| location, phone, and peripheral | Driving and not paired with hands-free headset, initiate or receive a call | Bluetooth Speaker | Car Installation Service |
| location and media | Driving and video recording | Car Mount | Car Installation Service |
| media | Running App/Pandora/Golf App | Arm Band/Headset/Golf Sensor | Home Installation Service |
| media and peripheral | Using headphones or phone speaker | Advanced Headphones/Wireless Speakers | Home Installation Service |
| media and peripheral | Not paired with Bluetooth and recording | Wearable Camera | Home Installation Service |
| peripheral | Notify the customer based on their device (accessory needs to be applicable to the device) | Compatible Accessory | Home Installation Service |
| peripheral | New device and Talk Time between min and max of plan | Bluetooth Headset | Home Installation Service |
| phone, ambient light | Device in pocket, receives call | Bluetooth Headset | Home Installation Service |
| battery | Device battery at <50%; <40%; <30%; <20%; or <10% and not charging | Universal Charger | Power Management Software Service |
| battery | Time for full charge consumption is greater than an expected time (e.g., greater than 3 hours) | Moxie Juice Pack | Power Management Software Service |
| accelerometer | Device dropped | Protective Cover/Case | Device Repair Service |
| memory | Memory less than min for certain functions | SD Card/Memory Backup | Cloud Storage Service |

The management module 317 may further work in conjunction with the application module 311 and database 220 to generate and/or store records 321-329, as described below. For instance, when the management module 317 is on the provider device 201, the management module 317 may access or receive the records 321-329 from the computing devices 101 and utilize the records 321-329 to provide target, timely product and service recommendations. Access or receipt of the records 321-329 may be triggered by automatic or user initiated communication. Automatic communications may be a predefined set of circumstances that, when met, trigger the automatic downloading and storing of the records 321-329. The predefined set of circumstances may be user definable, such that the downloading and storing may automatically occur after a designated time has elapsed (e.g., every five minutes), on a specific schedule (e.g., once a day), or the like. Further, automatic communications may immediately follow the detection of a particular use-case as a result of the devices 101, 102 being presently connected within the 200 scheme or may immediately follow a re-connection, such as when the computing device 101a re-connects to the provider device 201 after being initially disconnected. User initiated Thus, the application 210 may generally be operated by the devices 101, 201. The application 210 may include configurable settings, which may be associated with the application 210, stored within the database 220 of the memory 203, as defined below. The configurable settings may further govern targeted, timely product and service recommendations by managing consent requirements from a user of the application 210. Consent may be acquired by leveraging user interfaces 314, as described below, to facilitate notifications to the user and receive user inputs indicating consent in response to the notifications.

The targeted, timely product and service recommendations of the application 210 may be based on browsing and/or accessory browsing history; previous and/or accessory purchase history; and/or usage patterns by device sensors (e.g., accelerometer, GPS, power managers, and media managers). Examples of targeted, timely product recommendations include a protective case recommendation, a hands-free headset recommendation, a SD card recommendation, and a charger recommendation. Examples of targeted, timely service recommendations device repair service, hands-free car system installation service, home installation service, cloud storage service, and power management software service.

To recommend a protective case, the application 210 detects when the computing device 101 is dropped, by using the accelerometer listener of the management module 317 to monitor the speed of the device computing device 101. The application 210, in turn, will recommend a protective case that is custom to that device via a user interface 314 generated by the interface module 313, and enable a user to purchase the protective case by directly linking to an information page for the protective case. The application may also (or in place of the protective case recommendation) recommend a device repair service when the computing device is likely damaged due to a detected drop. An information page (which may also be referred to as a product display page) is a user interface 314 that presents information for a product and/or service, such as make, model, size, weight, price, compatibility, company information, service time, service conditions, etc.

To recommend a hands-free headset, the application detects when a user is driving, answers a call (e.g., or operates the computing device 101b in another manner, such as texting or web browsing), and talks without a hands-free headset, by using the accelerometer, GPS, and Bluetooth listeners of the management module 317 to monitor a pairing status. A pairings status is an indication that the conditions of the particular use case are met (e.g., each listener outputs a Boolean 'high' signal). When the user stops driving, the application will recommend a hands-free headset that is compatible with the computing device 101b via a user interface 314 generated by the interface module 313, and enable the user to purchase the hands-free headset by directly linking to a product display page for the hands-free headset. The application may also (or in place of the hands-free headset recommendation) recommend a hands-free car system installation service.

To recommend a SD card, the application 210 detects when a user is acquiring media (e.g., recording a video) and has very little space (e.g., below a specified memory threshold) remaining on a current SD Card of the computing device 101c. The application 210 will recommend a larger capacity SD card that is compatible with the computing device 101c, and enable the user to purchase the larger capacity SD card by directly linking to a product display page for the larger capacity SD card. The application may also (or in place of the larger capacity SD card recommendation) recommend a cloud storage service.

To recommend a compatible charger, the application 210 detects when a user is using a charger that is not optimal for the computing device 101, with respect to the speed at which an optimal charger is able to charge the computing device 101. The application will recommend the optimal charger that is fully compatible with that computing device 101, and enable the user to purchase the optimal charger by directly linking to a product display page for the optimal charger. The application may also (or in place of the optimal charger recommendation) recommend a power management software service.

Examples of the application 210 being operated by the devices 101, 201 also include a dedicated application for managing device activity detection and product notification in a dedicated folder (e.g., database 220) or an existing application that leverages other software of the devices 101, 201. In either case, browsing history, previous purchases, device activity, and/or usage patterns may be associated and memorialized with device and user profiles in records 321-329 by the application 210 for later use by the devices 101, 201. For instance, the application 210 may utilize the modules 311, 313, 317 in conjunction to monitor 110 device activities of the computing 101a and detect 120 particular use-cases when a combination of device listeners of the application 210 output a set of Boolean 'high' signals that indicate a particular use-case.

For example, with regard to 'drop detection,' the application 210 detects a drop when the accelerometer listener of the management module 311 outputs a Boolean 'high' signal based on an accelerometer value of the accelerometer 205 of computing device 101a. In response to receiving the Boolean 'high' signal from the accelerator listener, the application 210 provides a notification 130 via a user interface 314 of the interface module 313 of a product, e.g., relating to a case for protection of the computing device.

Further, with regard to 'use while driving,' the application 210 detects driving and computing device 101b use when the phone, peripheral, and location listeners of the management module 317 output Boolean 'high' signals. In response to receiving the Boolean 'high' signals from the phone, peripheral, and location listeners, the application 210 provides a notification 130 user interface 314 of the interface module 313 of a product, e.g., relating to a hands-free headset.

Furthermore, with regard to 'acquiring media and a limited memory,' the application 210 detects a media acquisition by the computing device 101c and a limited memory space of a current memory of the computing device 101c when the media and memory listeners of the management module 317 output Boolean 'high' signals. In response to receiving the Boolean 'high' signals from the media and memory listeners, the application 210 provides a notification 130 user interface 314 of the interface module 313 of a product, e.g., relating to a secure digital (SD) card that is larger than the current memory of the computing device 101c.

Examples of the application 210 being operated by the provider device 201 include a dedicated application for evaluating records 321-329 accessed or received from the computing devices 101 or an existing application that leverages other software of the provider device 201 to enable evaluations of records 321-329. That is, the application 210 of the provider device 201 may access or retrieve those same records 321-329 to accumulate device activity. The application 210 of the provider device 201 may further evaluate the accumulated device activity to assess each user's activities with respect to the computing devices 101. Based on the assessment, the application 210 of the provider device 201 may provide services to the computing devices 101 and/or users of those devices, such as providing targeted, timely product and service recommendations. For instance, the provider device 210 may detect the particular use case of 'use while driving' for the computing device 101b by receiving location values and call/message information and, in turn, providing notifications 130 to the computing device 101b.

The database 220, as described above, may include various kinds of mechanisms for storing, providing, accessing, and retrieving various kinds of data, such as records 321-329. Records 321-329 may be of different types, where each type digitally information for that record type. Example of record types include, but are not limited to, browser history 323, purchase history 324, device profile 325, device activity 326, and user profile 328.

Browser history 323 digitally represents a list of web pages a user has visited, along with associated data such as page title and time of visit. Purchase history 324 digitally represents a list of ecommerce purchases by a user, along with associated data such as item, store, and price. Device profile 325 digitally represents a characteristic of a user device (e.g., the computing devices 101), such as make, model, and version. Device activity 326 digitally represents a history of detected activity by the listeners of the management module 317. User profiles 328 digitally represent user accounts and include configurable settings (e.g., identify users and their preferences to regarding notification). Examples of configurable settings may include but are not limited to frequency of notification, permissions relating to activity detection, billing services, user preferences, and/or user account settings.

Thus, records 321-329 enable the service provider to gather user traffic and behavioral data insights that can be leveraged to create targeted and timely marketing strategies (e.g., product and service recommendations). Records 321-329 may also be embedded with a unique identifier that is utilized by the application 210 to associate operations with a particular user, device, user activity, and/or device activity. For example, the unique identifier may associated with a user profile 328 and when that unique identifier is utilized to access a website from any computing devices 101 during web browsing, the application 210 may associate that web browsing operation with the user profile 328 and future recommendation to that user profile 328.

In addition, FIG. 3 respectively illustrates browser histories 323.0 to 323.$i$, purchase histories 324.0 to 324$j$, device profiles 325.0 to 325.$k$, device activities 326.0 to 326.$m$, and user profile 328.0 to 328.$n$. The notations of 'i,' 'j,' 'k,' 'm,' and 'l' indicate a plurality of records for each record type stored on the database 220. Further, the records 321-329 may be duplicated between the devices 101, 201, such that an original record 321 stored on the computing devices 101 have a matching or corresponding record 321 stored on the provider device 101. Thus, regardless of whether the devices 101, 201 are connected, any device 101, 201 at any time may analyze the records 321-329 to generate timely product and service recommendations.

Figure 4:
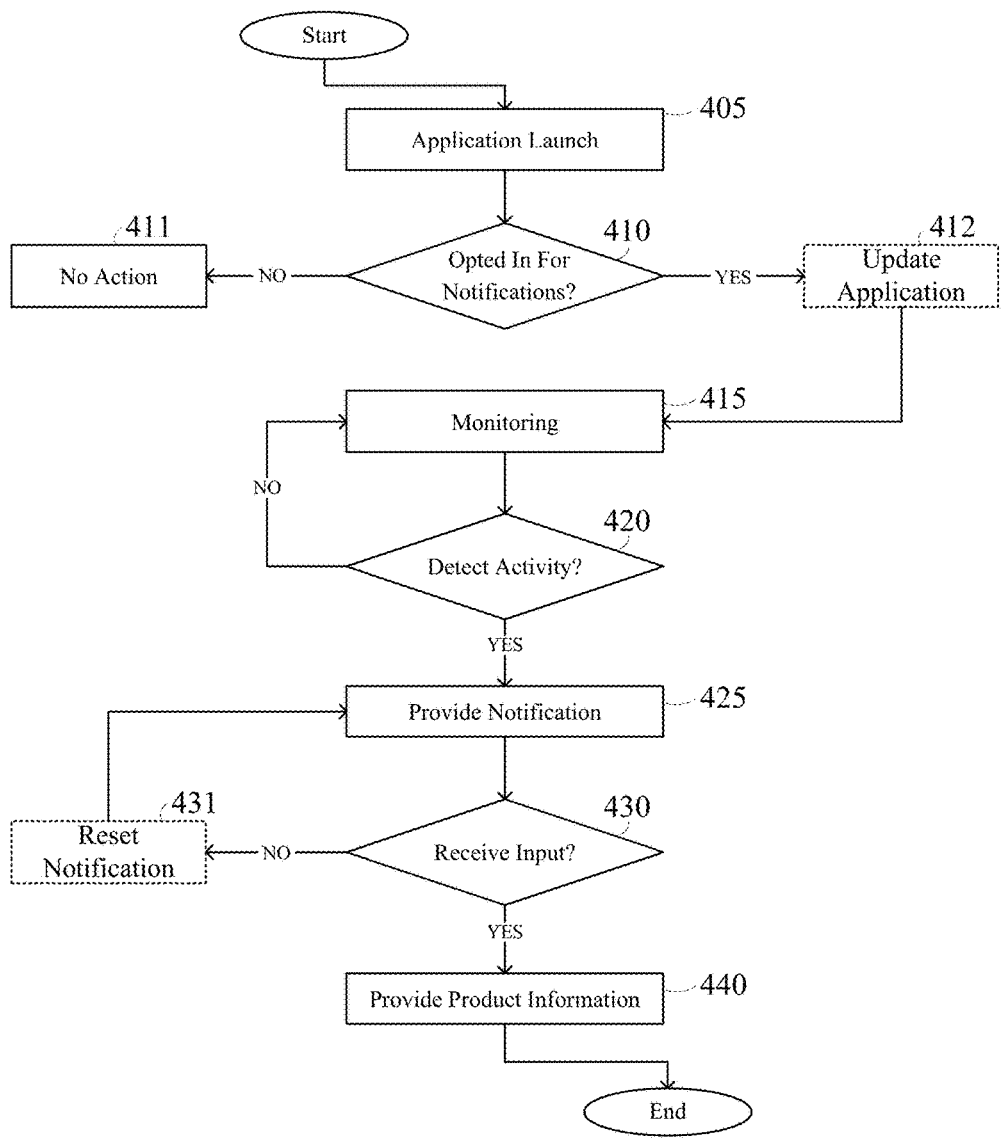
FIG. 4 illustrates a flow of a product notification and recommendation technology.

FIG. 4 illustrates a flow 400 of a product notification and recommendation technology as represented through a fully integrated application 210 of the computing device 101. The flow 400 begins that begins with a launch 405 of the application 210. For example, a user may through operation of their mobile phone (e.g., computing device 101) select an icon that links to a start-up action of the application 210.

Once the application launches 405, the management module 317 verifies whether the user of that device has opted-in 410 to receive notifications based on user activity. When the user has not opted-in to receive notification, the application 210 may provide a navigable user interface 314 for browsing product pages and no 411 further monitoring and detecting activity may be taken.

When the user has opted-in to receive notifications, the application 210 may optionally connect with an internal database 220 or external device (e.g., provider device 201) to retrieve/receive 411 the most updated application 210 configurations, such as the most current product notifications. Regardless of retrieving/receiving updates, when the user has opted-in to receive notifications, the flow 400 proceeds to monitor 415 the computing device 101 by activating the devices listeners of the management module 317, which in turn retrieve data from the computing device 101 itself (examples of which device listeners are activated are found below, with reference to FIGS. 5-7). That is, the application 210 utilizes all of the device listeners of the management module 317 to receive data from the computing device 101 and its sensors. The application also utilizes the devices listeners to process and interpret that data so that conditions relating to particular use-cases may be detected.

Next, the application 210 checks whether the device activity has been detected 420. For example, the application 210 verifies whether a particular use-case occurs by determining if a combination of device listeners output a combination of values (examples of which combination of device listeners provide outputs to indicate a particular use-case are found below, with reference to FIGS. 5-7). If no device activity has been detected according to the particular use case, the flow 400 loops back to monitoring 410. If a particular use-case has been detected, the flow proceeds to provide 425 a notification of a product respective to the identified use-case.

In response to the notification, the application awaits to receive 430 an input (e.g., tapping on the notification by a user) that indicates to proceed to provide 440 product information, e.g., via a corresponding product display page. If the input is received, then the application 210 presents the product display page and enables a user to directly purchase the product directly after the particular use-case was detected. Optionally, if no input was received, the notification may be reset 431 to appear at a later time or not at all. For example, when the notification is presented, the application 210 may utilize a timer to count to a first value (e.g., such as fifteen seconds) and remove the notification after the timer counts to that first value. Then, the application 210 may utilize the timer to count to a second value (e.g., such as fifteen minutes) and re-provide the notification after the times counts to that second value. As another example, the input may indicate that a user does not desire to view the product display page, i.e., the input indicates the selection of an icon (e.g., such as an 'X' or 'Clear' icon) on the notification window, and the application 210 in response to the selection of the icon removes the notification. The notification may then subsequently appear when the same condition that drove the notification to be provided 425 re-occurs.

Next, the flow 400 ends.

Figure 5:
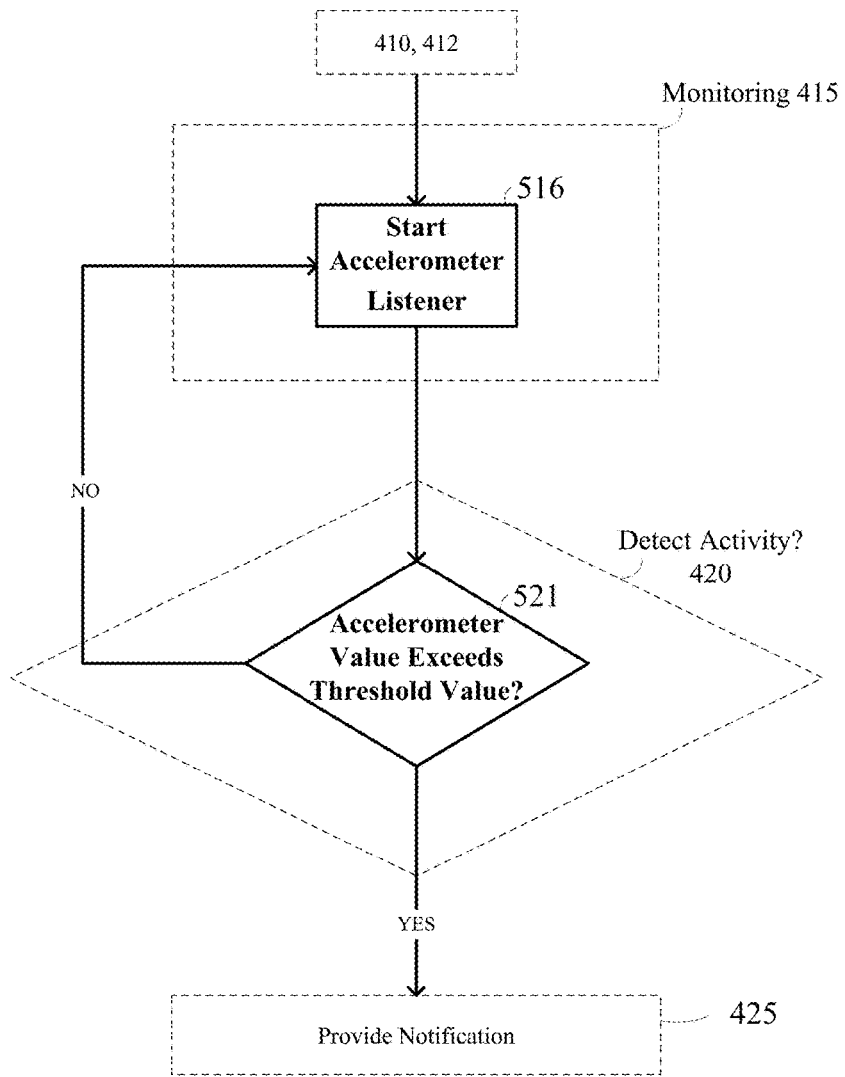
FIG. 5 illustrates an exemplary use case flow of a product notification and recommendation technology.
Figure 6:
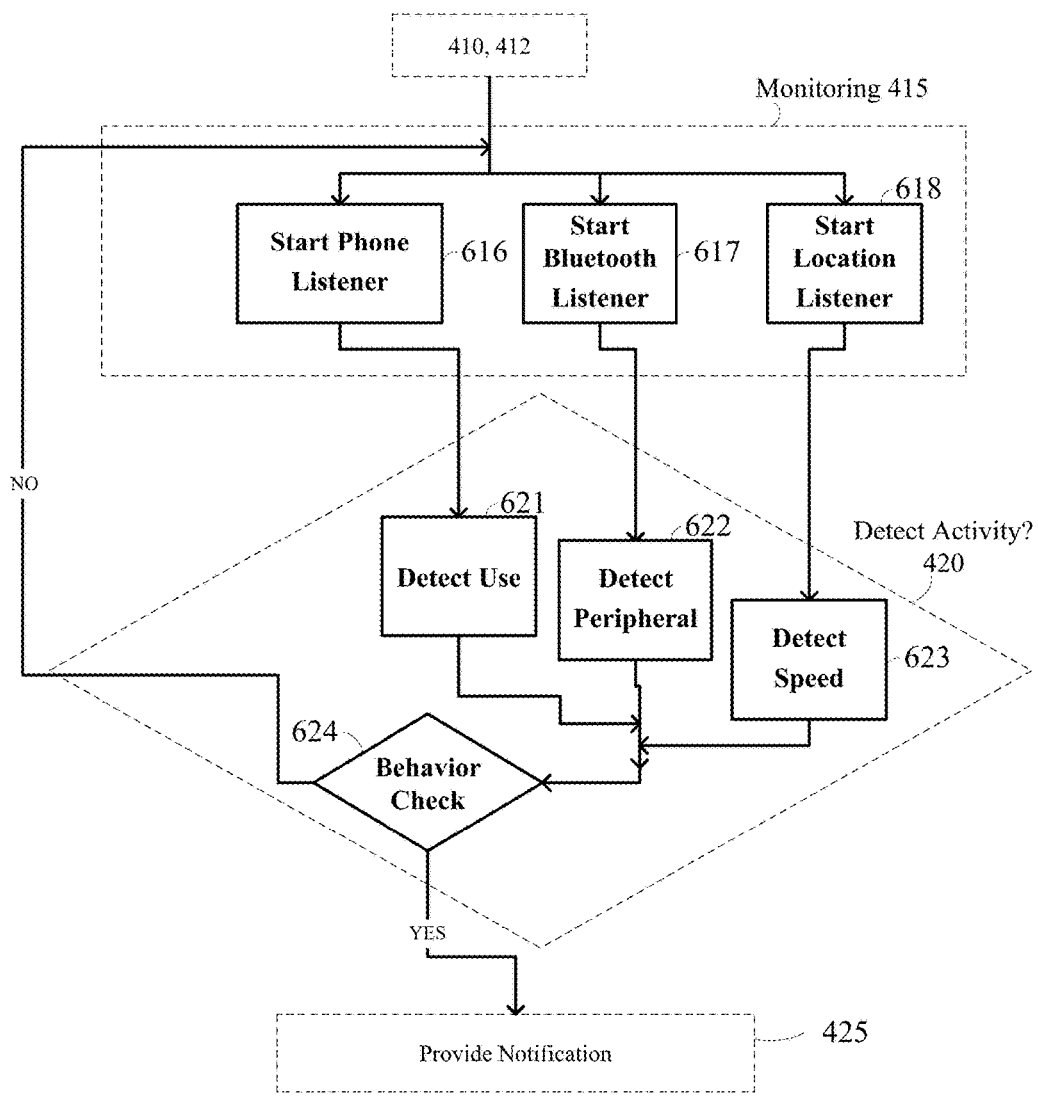
FIG. 6 illustrates an exemplary use case flow of a product notification and recommendation technology.
Figure 7:
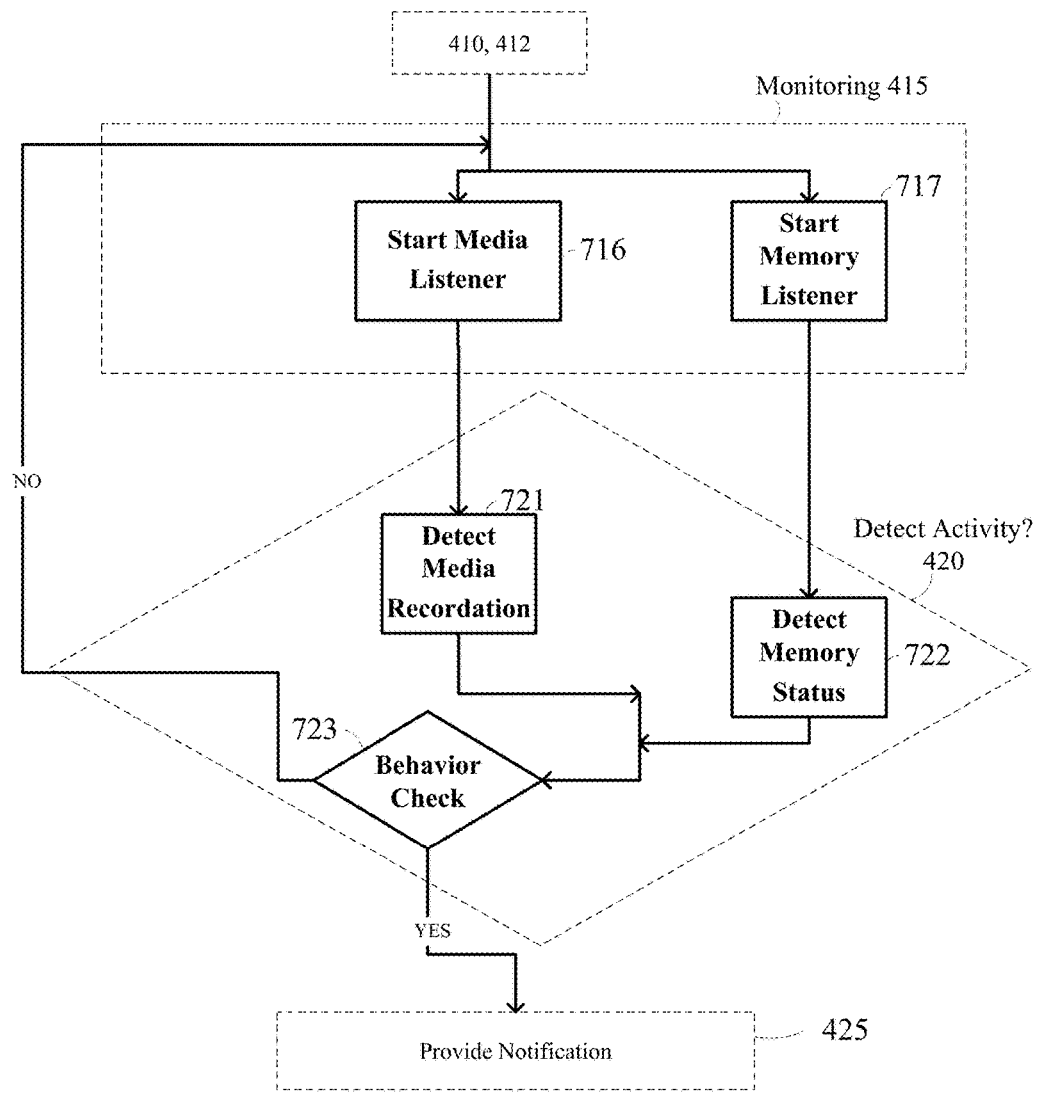
FIG. 7 illustrates an exemplary use case flow of a product notification and recommendation technology.

FIG. 5-7 illustrate exemplary use case flows 420A, 420B, 420C that respectively correspond to the computing devices 101$a$-$c$ of FIG. 1.

In the flow 420A, the application starts 516 an accelerometer listener that acquires the accelerometer value, e.g., from an accelerometer 206 of the computing device 101$a$. Then, the accelerometer listener compares 521 the accelerometer value to a threshold accelerometer value. When the accelerometer value is less than the threshold accelerometer value, the accelerometer listener may output a Boolean 'high' signal. When the application 210 receives the Boolean 'high' signal from the accelerator listener, the application 210 provides 425 a notification of a product, e.g., relating to a case for protection of the computing device. Note that different computing devices 101 may require different settings based on size and weight. Thus, the application 210 may calculate a threshold accelerometer value on a device basis. For instance, an accelerometer value of a phone at rest is 1.0 or close to 1.0. An accelerometer value of a first device in free fall may be less than or equal to 0.1, while an accelerometer of a second device in free fall may be less than or equal to 0.5 due to the difference in weight. Thus, the application may utilize the device profiles 352 corresponding to the first and second device to determine a threshold accelerometer value (e.g., 0.1 for a first device and 0.5 for a second device, or variations thereof).

In the flow 420B, the application starts 616 the phone listener to acquire call or messaging information of the computing device 101*b*, starts 617 the peripheral listener, and starts 618 the location listener to acquire a set of location values that include time and location components, e.g., from a location determination technology of the computing device 101*b*. Further, the application utilizes the phone listener to determine 621 from the call or messaging information when the computing device 101*b* is in use; the peripheral listener to detect 622 whether a peripheral is connected to the computing device 101*b*; and the location listener to calculate 623 a speed of the computing device 101*b* based on the set of location values. The application 210 may then continuously make a behavior check 624 of the phone, peripheral, and location listeners to determine whether all there listeners are outputting positive signal (e.g., Boolean 'high' signals). When the application 210 receives the Boolean 'high' signals from the phone, peripheral, and location listeners, the technology provides 425 a notification of a product, e.g., relating to a hands-free headset.

In the flow 420C, the application 210 starts 716 the media listener and starts the 717 the memory listener, which acquires memory information. Further, the application 210 utilizes the media listener to detect 721 whether media is being acquired by the computing device 101*c* and the memory listener to compare 722 a remaining memory value of the memory information to a threshold memory value (e.g., as indicated in Table 1). The application 210 may then continuously make a behavior check 723 of the media and memory listeners to determine whether these listeners are outputting positive signal (e.g., Boolean 'high' signals). When the application 210 receives the Boolean 'high' signals from the media and memory listeners, the application 210 provides 435 a notification of a product, e.g., relating to a secure digital (SD) card that is larger than the current memory of the computing device 101*c*.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description or Abstract below, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A method, comprising:
    monitoring a device to detect a plurality of device activities, each device activity being defined by a particular set of conditions related to the device and to an environment local to the device, including at least one of use and movement of the device; and
    providing a notification through a user interface that indicates at least one product or service from a plurality of recommendations in response to at least one of the plurality of device activities being detected, the at least one product or service corresponding to the detected device activity;
    wherein use of the device includes at least one of operating a call, messaging, web browsing by a user of the device, and gaming, and movement of the device includes at least one of a free fall of the device, a drop of the device, a call answering motion, and a driving speed movement when a speed of the device is greater than a threshold speed value;
    wherein monitoring the device to detect the plurality of device activities is done by:
        initiating a phone listener, the phone listener being configured to acquire call or messaging information of the device, wherein the call or messaging information includes destination information of a second device configured to receive a call or message;
        initiating a peripheral listener, the peripheral listener being configured to detect whether a peripheral is connected to the device while the phone listener acquiring call or messaging information; and
        initiating a location listener, the location listener being configured to acquire a set of location values from a location determination technology of the device while the peripheral listener detecting whether the peripheral is connected to the device; and
    wherein the particular set of conditions includes:
        detecting a device use from the call or messaging information;
        detecting an absence of the peripheral being connected to the device; and
        detecting a speed of the device based on the set of location values.

2. The method of claim 1, further comprises:
    receiving an input through the user interface that indicates a selection of the provided at least one product or service; and
    providing an information page of the at least one product or service in response to receiving the input.

3. The method of claim 1, further comprises:
    determining a notification opt-in status with regard to the device; and
    monitoring the device to detect the plurality of device activities when the notification opt-in status is in a positive state.

4. The method of claim 1, further comprising:
    monitoring the device to detect the plurality of device activities by initiating an accelerometer listener, the accelerometer listener being configured to acquire an accelerometer value from an accelerometer of the device.

5. The method of claim 4, wherein the particular set of conditions includes:
    detecting that the accelerometer value is less than a threshold value based on a weight of the device.

6. The method of claim 1, further comprising:
monitoring the device to detect the plurality of device activities by initiating a media listener, the media listener being configured to detect whether media is being acquired by the device.

7. The method of claim 6, further comprising:
monitoring the device to detect the plurality of device activities by initiating a memory listener, the memory listener being configured to acquire memory information of the device, wherein the memory information includes capacity information of a memory of the device.

8. The method of claim 7, wherein the particular set of conditions includes:
detecting that the media is being acquired by the device; and
detecting that the memory information is less than a threshold value.

9. The method of claim 1, further comprising:
monitoring the device to detect the plurality of device activities by initiating a battery listener, the battery listener being configured to acquire battery information of the device.

10. A system, comprising:
a first device storing a first application, the first application being executable by a processor of the first device to provide operations comprising:
determining a notification opt-in status with regard to the device; and
monitoring the first device to detect a plurality of device activities when the notification opt-in status is in a positive state, each device activity being defined by a particular set of conditions related to the first device and to an environment local to the first device, including at least one of use and movement of the first device; and
providing a notification through a user interface of the first application that indicates at least one product or service from a plurality of recommendations in response to at least one of the plurality of device activities being detected, the at least one product or service corresponding to the detected device activity;
wherein use of the device includes at least one of operating a call, messaging, web browsing by a user of the device, and gaming, and movement of the device includes at least one of a free fall of the device, a drop of the device, a call answering motion, and a driving speed movement when a speed of the device is greater than a threshold speed value; and
wherein monitoring the first device to detect the plurality of device activities is done by initiating:
a phone listener configured to acquire call or messaging information of the device;
a peripheral listener configured to detect whether a peripheral is connected to the device; and
a location listener configured to acquire a set of location values from a location determination technology of the device; and
wherein the particular set of conditions includes:
detecting a device use from the call or messaging information;
detecting an absence of the peripheral being connected to the device; and
detecting a speed of the device based on the set of location values.

11. The system of claim 10, the operations further comprising:
receiving an input through the user interface that indicates a selection of the provided at least one product or service; and
providing an information page of the at least one product or service in response to receiving the input.

12. The system of claim 10, the operations further comprising:
monitoring the device to detect the plurality of device activities by initiating an accelerometer listener, the accelerometer listener being configured to acquire an accelerometer value from an accelerometer of the device,
wherein the particular set of conditions includes detecting that the accelerometer value is less than a threshold value based on a weight of the device.

13. The system of claim 10, the operations further comprising:
monitoring the device to detect the plurality of device activities by initiating
a media listener configured to detect whether media is being acquired by the device, and
a memory listener configured to acquire memory information of the device,
wherein the particular set of conditions includes detecting that the media is being acquired by the device and that the memory information is less than a threshold value.

14. The system of claim 10, comprising:
a second device storing a second application, the second application being executable by a second processor of the second device to provide operations comprising:
proving product information regarding the plurality of recommendations after the first device has determined that the notification opt-in status is in the positive state.

* * * * *